(12) United States Patent
Hennen et al.

(10) Patent No.: US 7,050,450 B1
(45) Date of Patent: May 23, 2006

(54) TELECOMMUNICATIONS SYSTEM AND METHOD FOR PRODUCING A MASTER CLOCK IN THE SAME

(75) Inventors: Stefan Hennen, Gauting (DE); Eckhardt Belgardt, Bangalore (IN); Annette Roder, München (DE); Klemens Skorka, München (DE); Klaus Steinigke, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/763,483

(22) PCT Filed: Aug. 26, 1999

(86) PCT No.: PCT/EP99/06284

§ 371 (c)(1),
(2), (4) Date: May 25, 2001

(87) PCT Pub. No.: WO00/13352

PCT Pub. Date: Mar. 9, 2000

(30) Foreign Application Priority Data

Aug. 28, 1998 (EP) .................................. 98116322

(51) Int. Cl.
*H04L 12/28* (2006.01)
*H04L 12/56* (2006.01)
(52) U.S. Cl. .................................. 370/426; 370/395.62
(58) Field of Classification Search ................ 370/395, 370/503, 507, 516, 108, 76, 100.1, 110.1, 370/216, 350, 426, 496, 519, 522, 518, 395.62; 375/356, 357, 362, 359; 327/7; 713/400, 713/401; 714/789, 707, 34, 25
See application file for complete search history.

(56) References Cited

U.S. PATENT DOCUMENTS

| | | | | |
|---|---|---|---|---|
| 3,831,142 A | * | 8/1974 | Fletcher et al. | 714/789 |
| 4,791,629 A | * | 12/1988 | Burns et al. | 370/363 |
| 4,896,338 A | * | 1/1990 | Rouillet et al. | 375/373 |
| 5,159,596 A | * | 10/1992 | Itoh | 370/329 |
| 5,504,774 A | * | 4/1996 | Takai et al. | 375/134 |
| 5,638,410 A | * | 6/1997 | Kuddes | 375/357 |
| 5,689,689 A | * | 11/1997 | Meyers et al. | 709/400 |
| 6,163,551 A | * | 12/2000 | Wolf | 370/503 |
| 6,212,197 B1 | * | 4/2001 | Christensen et al. | 370/463 |

FOREIGN PATENT DOCUMENTS

| | | |
|---|---|---|
| EP | 0 723 344 A2 | 12/1995 |
| EP | 0 723 344 A2 | 7/1996 |
| EP | 0 802 643 A2 | 3/1997 |
| EP | 0 849 904 A2 | 12/1997 |
| EP | 0 849 904 A2 | 6/1998 |

* cited by examiner

*Primary Examiner*—Wellington Chin
*Assistant Examiner*—Jamal A. Fox
(74) *Attorney, Agent, or Firm*—Fish & Richardson P.C.

(57) ABSTRACT

A telecommunications system includes devices to provide output clock signals that are synchronous to at least one source clock signal. A main clock generator includes a selector to select one of the output clock signals. The main clock generator generates a main clock signal based on a selected one of the output clock signals. Each of the devices includes a quality detector (i) to detect a quality of the at least one source clock signal, and (ii) to interrupt providing an output clock signal in response to a decrease in quality of the at least one source clock signal. The main clock generator includes an interrupt detector to detect an interruption in an output clock signal provided by at least one of the devices. The selector selects a different output clock signal if the interrupt detector detects that the selected one of the output clock signals is interrupted.

29 Claims, 2 Drawing Sheets

TELECOMMUNICATIONS SYSTEM AND METHOD FOR PRODUCING A MASTER CLOCK IN THE SAME

Figure 1:
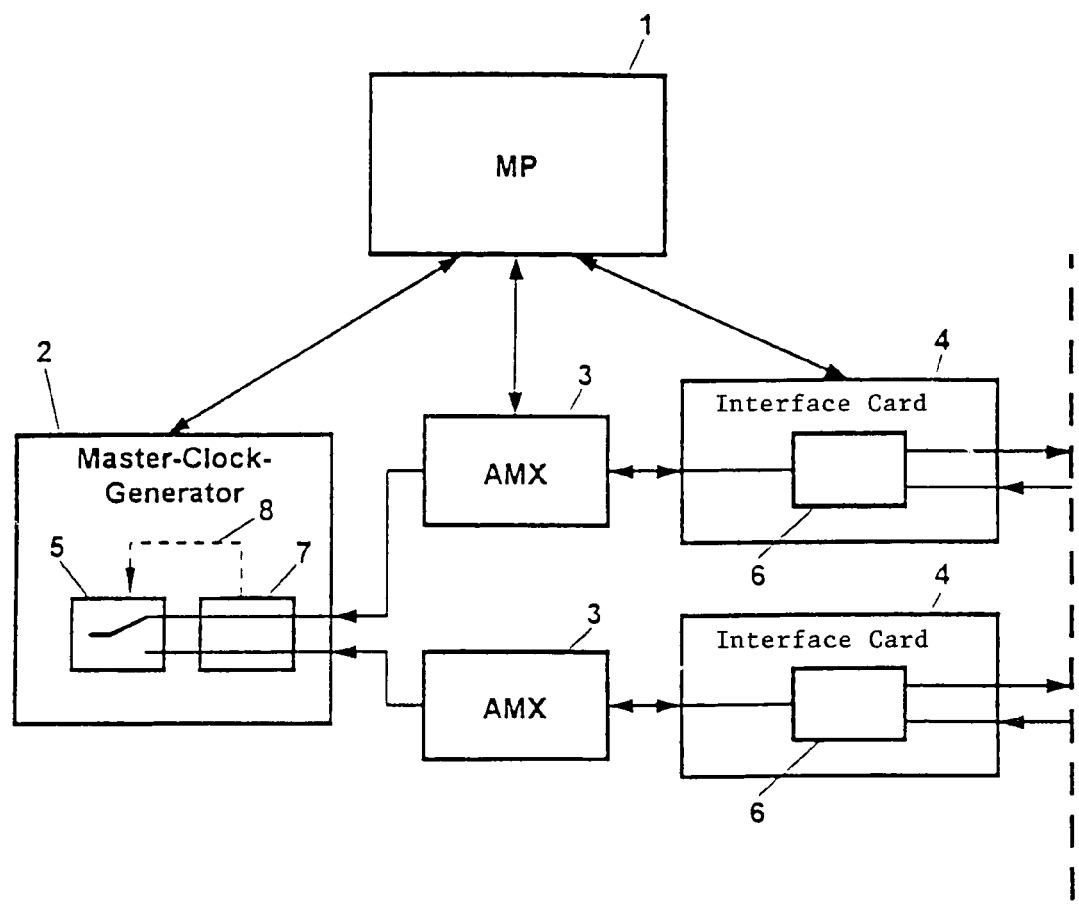

The invention concerns a telecommunications system according to the precharacterizing clause of Patent Claim 1 and a method for generating a master clock in such a telecommunications system. In particular the invention concerns digital telecommunications systems with at least two reference clocks which are redundant to each other and devices and methods for handling the loss of one of the reference clocks.

Telecommunications is a collective designation for all communications technology transmission methods through varied services in communications across relatively large distances between man—man, man-machine, and machine—machine. Through the growing together of information technology and communications technology, telecommunications is receiving a completely different significance. Telecommunications is characterized by transmission technology with cable technology, radiotelephony, data telephony, satellite technology, optical waveguide technology, modems, digital switching systems and switching technique, and local networks.

In order to facilitate meaningful information exchange between two (or more) partners, in addition to the pure transmission of information, a set of rules is necessary which determines the conventions which must be complied with for meaningful communication in the form of protocols. Rules of this kind are described, by way of example, in the service specifications of the individual levels of the OSI (open systems interconnection) reference model. The OSI reference model was prepared in the year 1983 by the International Standards Organization (ISO) starting with the transmission of information in the area of data processing and has since also become widely applied in the applications of communications systems.

The OSI model represents only principles of telecommunications transmission and accordingly only defines the logic of the information flow between participants. Since the OSI standard does not contain any specifications concerning the physical transmission of communications, it is manufacturer-independent, but for realization of a communications system, supplemental protocols are required for detailed specification based on other, by way of example, proprietary standards.

A fundamental distinction can be made between asynchronous and synchronous communication. Asynchronous communication generally means the exchange of information, completely decoupled with respect to time, between a sending entity and a receiving entity. It cannot be predicted when a send and an associated receive operation will be initiated.

In contrast, synchronous communication means the exchange of messages between a sending entity and a receiving entity in the event this exchange takes place in a fixed time frame. A send operation and the associated receive operation must always be performed at the same time.

Telecommunications networks are characterized by the possibility of bi- and multidirectional data exchange between the participants. This presupposes that each involved participant can communicate with each other participant over the same medium. The simplest realization of this is communication by all participants in the baseband. As a result of the plurality of parallel active participants, primarily methods are used in this case which statically assign the available bandwidth to the participants in the time division multiplex. As a result of the increasing use of optical waveguide technology, the necessity of improved intercontinental data communications, and increased capacity requirements, the plesiochronous digital hierarchy (PDH) which has predominated since the 1960s is increasingly being replaced by the synchronous digital hierarchy (SDH). The SDH international standard issued by the International Telecommunications Union (ITU) resulted from the American standard SONET (Synchronous Optical Network), which was developed by the firm Bellcore in the United States and had its origins in the standard adapted by the Industrial Carriers Compatibility Forum (ICCF) in 1984.

Traditional telecommunications structures are based on time division multiplexing (TDM). In contrast, ATM (asynchronous transfer mode) transmits data only when it is necessary, i.e., frames are transmitted asynchronously. The first recommendations for ATM were published in the years 1990/1991, and both the ITU and the ATM Forum, which was founded in September 1991, worked with the standardization of ATM.

As is the case with other transmission methods, ATM fundamentally is based on packet transmission technology. Similarly to the OSI reference model, ATM is also subdivided vertically into several layers. In addition, there is a horizontal classification according to aspects of the data exchange between users, aspects of communications control, and management aspects. An illustration of the individual ATM layers onto the layers of the OSI reference model is not readily possible since the functions of some of the ATM layers are distributed over different OSI layers. In OSI terminology, ATM would be posited on the bit transmission level, but in addition it also provides several functions of the safeguarding level.

For transmission, ATM uses exclusively packets with a fixed length of 53 bytes. This rigid transmission unit is designated an ATM line and consists of a five-byte-long header and 48 bytes of useful information (payload). Depending on the assignment of bits 5–8 of the first header byte, UNI cells are distinguished from NNI cells.

In order to facilitate incremental introduction of the ATM transmission method both in long-distance networks as well as in local networks, ATM is not tied to a particular transmission medium. The physical layer therefore is broken down into a media-dependent sublayer (PM) and a transmission-medium-independent sublayer (TC). The transmission of a cell takes place in a continuous cell stream. There is no fixed assignment between virtual ATM channels and time slots of the medium. On the contrary, several time slots are assigned in sequence for each virtual channel depending on the bandwidth required. The asynchrony in ATM therefore consists not of asynchronous access of the transfer medium with respect to time, but rather of the dynamic assignment of the bandwidth which can be used as a virtual channel based on the number of time slots required.

The direct transmission of ATM cells is the most efficient method since due to the adaptation to the transmission frame of medium there is no additional overhead. Instead, the cell stream is transmitted directly bit by bit. The essential drawback of direct cell transmission consists of the incompatibility with the transmission methods of the past in world communications networks since the infrastructure of these networks is based primarily on PDH and SDH systems.

Transmission through SDH is based on the interleaving of several ATM cells in the synchronous transport modules of the SDH hierarchy. Transmission of ATM cells over SDH in the past has been specified for SDH transmission rates of 155 Mbps and 622 Mbps (STM-1 and STM-4). In addition, the use of the STM-16 hierarchy level with 2.5 Gbps is provided.

Like ATM transmission over SDH, the use of existing PDH networks is provided for by the ITU. An ATM transmission over PDH hierarchy levels between 1.5 Mbps and 139 Mbps was standardized.

Telecommunications systems which have connections to standardized transmission networks such as PDH, SDH, or SONET as a rule require synchronization in order to achieve the necessary quality at the interface to the transmission network. Two operating modes of synchronization are distinguished. In the case of an external synchronization, a clock is brought directly to the system by an external synchronization source. In contrast, in synchronization through the transmission route, the clock is obtained from the received data stream of the interface and is applied to the system as synchronization source. For this purpose, the received data frames in addition to the payload contain among other things supplemental information which describes the quality of the clock signal of an opposite terminal.

For a portion of the interface types in plesiochronous digital hierarchy, clock quality is transferred in the timing marker bit. In the case of SONET and of synchronous digital hierarchy, the quality of the clock signal is communicated in the so-called SSM byte (synchronization status message).

Since clock quality of a clock source to which the telecommunications system is synchronized can be changeable and a reference clock can also be lost, at least two reference clocks which are redundant to each other are used for the synchronization of telecommunications systems. The loss of a reference clock must be recognized by the telecommunications system, and it must then automatically switch over to the redundant reference clock.

Figure 2:
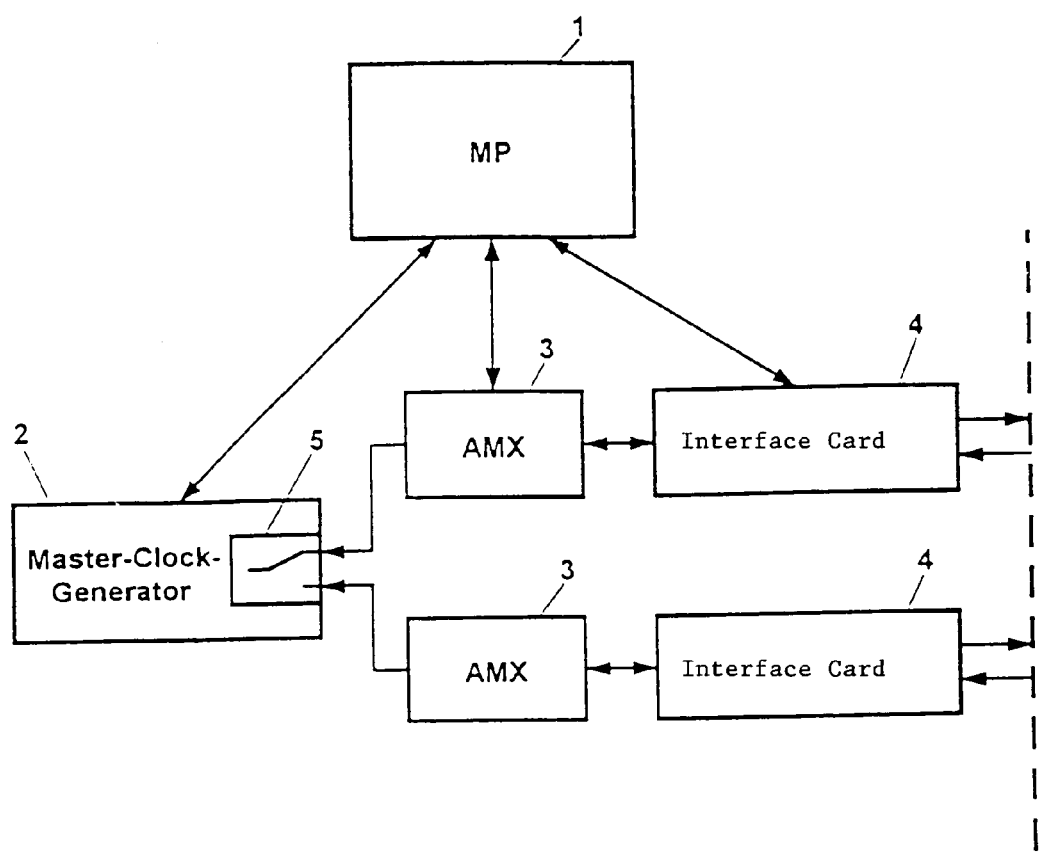

FIG. 2 shows a conventional telecommunications system which has a main processor MP 1, a master clock generator 2, and two peripheral processor platforms 3, 4. The processor platforms according to FIG. 2 have an ATM multiplexer AMX 3 and an interface card 4 and are connected to the master clock generator 2. Interface cards 4 are connected to transmission networks and receive from them, in the data stream, at least one clock signal each which they pass on to master clock generator 2 through AMX 3. Master clock generator 2 contains a clock selector 5 which selects one of the received clock signals and generates a master clock synchronous to it.

Main processor 1 has a central databank in which, in addition to information on the condition of individual components, alarms on units which have failed and the number of reference clocks, also data concerning each individual reference clock is filed. This clock-specific data encompasses the interface card from which the reference clock is taken, the priority, the current quality, and the availability of reference clock and alarm signals on lost reference clocks.

Along with the central database which is maintained by master processor 1, the telecommunications system also has decentral (local) databases to which, by way of example, master clock generator 2 has access. These decentral databases are images of the central database, but they contain only such data as is needed for the particular unit. If data in the central database is changed, the telecommunications system also updates the decentral databases.

Such a change of the central database takes place, by way of example, if a peripheral processor platform or another unit fails, if the quality of a reference clock changes, or if a new reference clock is set up.

If a processor platform, for example an interface card 4, recognizes the loss of a reference clock, it reports this to main processor 1. The main processor relays a corresponding message to main clock generator 2, whereupon the main clock generator switches over to the redundant reference clock. The main processor also takes over the updating of the central database, the distribution of the data to the local databases, and the sending of the alarm for the loss.

Telecommunications systems of the aforementioned type which in generating a main clock have the described failure treatment, have the drawback that clock selector 5 of main clock generator 2 does not switch over to the redundant reference clock until after the time at which main processor corresponding message to main clock generator 2, whereupon the main clock generator switches over to the redundant reference clock. The main processor also takes over the updating of the central database, the distribution of the data to the local databases, and the sending of the alarm for the loss.

Telecommunications systems of the aforementioned type which in generating a main clock have the described failure treatment, have the drawback that clock selector 5 of main clock generator 2 does not switch over to the redundant reference clock until after the time at which main processor 1 is needed for receiving and relaying fault messages. During this period of time, the telecommunications system is without a suitable reference clock, so that the clock frequencies can shift and data errors can occur on the transmission route.

Known from EP 0 849 904 A 2 is a synchronous digital telecommunications transmission system which contains network elements, a central clock generator, and a control device. The system facilitates the transmission of a quality indicator corresponding to the precision of the reference clock used in a network node. The selection of a reference clock takes place in the central clock generator which sends a message to the control device concerning its synchronization condition. The message contains the precision of the reference clock and the origin of the clock. The control device in turn sends instructions to all network elements as to which quality indicator they must relay to what output. Two of the network elements forward a clock signal to the central clock generator which contains a clock and in addition a quality indicator. The central clock generator selects one of these clock signals on the basis of the quality indicators. In the event of a fault, the synchronizer of the central clock generator continues to run in unsynchronized operation. The transmission of the message to the control device concerning the synchronization condition of the central clock generator is described as being not time critical, since a change in the precision of the reference clock does not take effect on the synchronous digital telecommunications transmission system until a relatively long period of time of several hours or days.

The invention is based on the task of suggesting a telecommunications system and a method for generating a main clock in a telecommunications system with a lower degree of susceptibility to fault.

This task is solved through the objects of patent claims 1 and 15.

Advantageous embodiments of the invention are the objects of the dependent patent claims.

With the invention it is in particular achieved that the fault recognition and fault neutralization take place decentrally. As a result, the main clock generator recognizes a loss or a decline in quality directly from the peripheral processor platform and thus can quickly switch over to a redundant reference clock. As a result, the susceptibility of the telecommunications system to losses is reduced.

FIG. 1 shows a preferred exemplary embodiment of a telecommunications system according to the invention and FIG. 2 shows a conventional telecommunications system.

In FIG. 1, a preferred exemplary embodiment of a telecommunications system is shown which, as described above, comprises a main processor 1, a main clock generator 2 with a clock selector 5 as well as peripheral platforms 3, 4. The peripheral platforms advantageously in turn have an ATM multiplexer AMX 3 and an interface card 4. Beyond the conventional telecommunications system described in FIG. 2, interface cards 4 have quality detectors 6 which determine the quality of the clock signal received from interface card 4 and interrupt the clock signal upon a decrease in the particular detected quality. By way of example, the quality detection by quality detector 6 can take place through reading and evaluating the timing marker bits in the case of a PDH interface card or of the SSM bytes in the case of SDH or SONET interface cards. According to another embodiment, the quality detector detects only the loss of the clock signal.

If quality detector 6 recognizes a drop in quality, preferably below a threshold value, or loss, it prevents the forwarding of the clock signal to main clock generator 2 over ATM multiplexer 3. Main clock generator 2 in contrast to the conventional telecommunications system depicted in FIG. 2 furthermore has an interrupt detector 7 which recognizes the loss of one of the clock signals provided by ATM multiplexer 3 and interface card 4. In the case of such an interruption, interrupt detector 7 instructs clock selector 5 of main clock generator 2 over interrupt control line 8 to switch over to a redundant reference clock.

Preferably this interrupt is hardware controlled. In another preferred exemplary embodiment, the switchover to the redundant reference clock, however, is software controlled. Preferably data located in the local database is queried for this purpose.

Following the switchover to a redundant reference clock, main processor 1 is informed by the peripheral processor platforms by means of error messages concerning the decline in clock quality and the switchover to a redundant reference clock, whereupon main processor 1 updates the central database. Following this, the main processor distributes the updated data to the local databases. Finally, the sending out of the alarm of the fault can take place on the central main processor.

According to a variant of the preferred exemplary embodiment, the telecommunications system contains at least three peripheral processor platforms 3, 4. Upon a reduction of quality or a loss of the selected clock signal, clock selector 5 is instructed by interrupt detector 7 to switch over to one of the remaining redundant reference clocks. Main clock generator 2 then with the aid of the local database selects the reference clock whose quality is highest.

Preferably quality detector 6 of interface card 4 determines the quality of the received clock signal and interrupts the relaying of this clock signal on a software controlled basis. The interruption, however, can also take place on the basis of hardware control.

According to a further development of the preferred embodiment, quality detector 6 is a part of ATM multiplexer 3. Quality detector 6, however, can also be a self-contained unit along side ATM multiplexer 3 and interface card 4.

What is claimed is:

1. A telecommunications system comprising:
   devices to provide output clock signals that are synchronous to at least one source clock signal, at least one of the devices comprising an interface card to a transmission network; and
   a main clock generator comprising a selector to select one of the output clock signals, the main clock generator generating a main clock signal for the telecommunications system based on a selected one of the output clock signals;
   wherein each of the devices comprises a quality detector (i) to detect a quality of the at least one source clock signal, and (ii) to interrupt providing an output clock signal in response to a decrease in quality of the at least one source clock signal;
   wherein the main clock generator comprises an interrupt detector to detect an interruption in an output clock signal provided by at least one of the devices; and
   wherein the selector selects a different output clock signal if the interrupt detector detects that the selected one of the output clock signals is interrupted.

2. The telecommunications system of claim 1, wherein the devices comprise at least three devices; and
   wherein the selector selects a different output clock signal with a highest quality if the selected one of the output clock signal is interrupted.

3. The telecommunications system of claim 1 or 2, wherein the telecommunications system comprises a digital telecommunications system.

4. The telecommunications system of claim 1 or 2, wherein the telecommunications system has an asynchronous transfer mode (ATM) architecture.

5. The telecommunications system of claim 4, wherein at least one of the devices comprises an ATM multiplexer.

6. The telecommunications system of claim 1 or 2, wherein the at least one source clock signal comes from a transmission route of the transmission network.

7. The telecommunications system of claim 6 wherein the transmission route comprises a plesiochronous digital hierarchy (PDH) transmission route; and
   wherein the quality detector evaluates a timing marker bit of the at least one source clock signal.

8. The telecommunications system of claim 6, wherein the transmission route comprises a synchronous digital hierarchy (SDH) transmission route; and
   wherein the quality detector evaluates a synchronization status message (SSM) byte of the at least one source clock signal.

9. The telecommunications system of claim 6, wherein the transmission route comprises a synchronous optical network (SONET) transmission route; and
   wherein the quality detector evaluates a synchronization status message (SSM) byte of the at least one source clock signal.

10. The telecommunications system of claim 1 or 2, wherein at least one of the devices interrupts providing an output clock signal if the at least one source clock signal is lost.

11. The telecommunications system of claim 1 or 2, wherein interrupts produced by the devices are hardware-controlled.

12. The telecommunications system of claim 1 or 2, wherein interrupts produced by the devices are software-controlled.

13. The telecommunications system of claim 1 or 2, wherein the selector is hardware-controlled.

14. The telecommunications system of claim 1 or 2, wherein the selector is software-controlled.

15. A method of generating a main clock signal in a telecommunications system, comprising:
providing output clock signals that are based on at least one received clock signal, the output clock signals being provided from devices, at least one of the devices comprising an interface card to a transmission network;
selecting one of the output clock signals;
using a selected one of the output clock signals to generate the main clock signal;
determining a quality of the at least one received clock signal using at least one device;
interrupting an output clock signal from the at least one device in response to a decrease in quality of at least one received clock signal; and
selecting a different output clock signal for use in generating the main clock signal if the selected one of the output clock signals is interrupted.

16. The method of claim 15, wherein at least three output clock signals are provided; and
wherein a different output clock signal with a highest quality is selected if the selected one of the output clock signals is interrupted.

17. The method of claim 15 or 16, wherein the telecommunications system comprises a digital telecommunications system.

18. The method of claim 15 or 16, wherein the telecommunications system runs the asynchronous transfer mode (ATM) protocol.

19. The method of claim 15 or 16, wherein the at least one received clock signal comprises a source clock signal from at least one transmission route of the transmission network.

20. The method of claim 19, wherein the transmission route comprises a plesiochronous digital hierarchy (PDH) transmission route; and
wherein determining the quality comprises evaluating a timing marker bit of the at least one received clock signal.

21. The method of claim 19, wherein the transmission route comprises a synchronous digital hierarchy (SDH) transmission route; and
wherein determining the quality comprises evaluating a synchronization status message (SSM) byte of the at least one received clock signal.

22. The method of claim 19, wherein the transmission comprises a synchronous optical network (SONET) transmission route; and
wherein determining the quality comprises evaluating a synchronization status message (SSM) byte of the at least one received clock signal.

23. The method of claim 15 or 16, wherein interrupting is hardware-controlled.

24. The method of claim 15 or 16, wherein interrupting is software-controlled.

25. The method of claim 15 or 16, wherein selecting the different output clock signal is hardware-controlled.

26. The method of claim 15 or 16, wherein selecting the different output clock signal is software-controlled.

27. The method of claim 26, wherein selecting the different output clock signal comprises consulting a local database in order to make a selection.

28. The method of claim 15 or 16, wherein selecting the different output clock signal comprises updating a central database.

29. The method of claim 15 or 16, further comprising:
outputting an alarm after selecting the different output clock signal.

* * * * *